United States Patent
Wu et al.

(10) Patent No.: US 12,381,654 B2
(45) Date of Patent: Aug. 5, 2025

(54) ASSISTANCE SIGNALING FOR RADIO LINK CONTROL RETRANSMISSIONS

(71) Applicant: QUALCOMM Incorporated, San Diego, CA (US)

(72) Inventors: Liangming Wu, Beijing (CN); Changlong Xu, Beijing (CN); Kangqi Liu, San Diego, CA (US); Jian Li, Shanghai (CN); Xipeng Zhu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 322 days.

(21) Appl. No.: 17/997,652

(22) PCT Filed: Jun. 30, 2021

(86) PCT No.: PCT/CN2021/103406
§ 371 (c)(1),
(2) Date: Oct. 31, 2022

(87) PCT Pub. No.: WO2022/002107
PCT Pub. Date: Jan. 6, 2022

(65) Prior Publication Data
US 2023/0299882 A1    Sep. 21, 2023

(30) Foreign Application Priority Data
Jun. 30, 2020   (WO) ................ PCT/CN2020/099238

(51) Int. Cl.
*H04L 1/08*  (2006.01)
*H04L 1/1867*  (2023.01)

(52) U.S. Cl.
CPC .............. *H04L 1/08* (2013.01); *H04L 1/1887* (2013.01)

(58) Field of Classification Search
CPC ................................ H04L 1/08; H04L 1/1887
See application file for complete search history.

(56) References Cited

U.S. PATENT DOCUMENTS 11,032,189 B2 *   6/2021   Jo ........................... H04L 45/28
2007/0168827 A1 *   7/2007   Lohr ..................... H04L 1/1845
714/749

(Continued)

FOREIGN PATENT DOCUMENTS

| CN | 108391287 A | 8/2018 |
| CN | 109274467 A | 1/2019 |
| CN | 109547168 A | 3/2019 |

OTHER PUBLICATIONS

Catt: "QoS Control for LAA UL Transmission", 3GPP TSG RAN WG2 Meeting #90, R2-152279, Fukuoka, Japan, May 25-29, 2015, May 29, 2015 (May 29, 2015) the Whole Document, pp. 1-2.

(Continued)

*Primary Examiner* — Michael Thier
*Assistant Examiner* — Nevena Zecevic Sandhu
(74) *Attorney, Agent, or Firm* — Holland & Hart LLP

(57) ABSTRACT

Methods, systems, and devices for wireless communication are described. Generally, the described techniques provide for sending, from an upper layer at a transmitting device to a lower layer at the transmitting device, an indication by which the lower layer determines that a packet is to be transmitted as either an initial transmission or as a retransmission. The lower layer at the transmitting device may then determine a transmission process for transmitting the packet based on the indication, and the transmitting device may transmit the packet in accordance with the transmission process. Because the lower layer may identify whether the packet is to be transmitted as either the initial transmission or the retransmission, the lower layer may adapt the trans- (Continued)

mission process to improve the chances that the packet is received by a receiving device or to limit overhead.

18 Claims, 14 Drawing Sheets

(56) References Cited

U.S. PATENT DOCUMENTS

| | | | | |
|---|---|---|---|---|
| 2008/0219291 A1* | 9/2008 | Obuchi | ............... | H04L 1/1887 370/469 |
| 2010/0153807 A1* | 6/2010 | Kakani | ............... | H04W 4/06 714/E11.131 |
| 2013/0128841 A1* | 5/2013 | Choi | ............... | H04W 4/06 370/328 |
| 2014/0198643 A1* | 7/2014 | Conway | ............... | H04W 28/0252 370/252 |
| 2017/0245178 A1* | 8/2017 | Nobukiyo | ............... | H04W 28/14 |
| 2018/0375623 A1* | 12/2018 | Suzuki | ............... | H04W 72/04 |
| 2019/0140787 A1 | 5/2019 | Kim et al. | | |
| 2019/0297530 A1* | 9/2019 | Ohta | ............... | H04W 68/005 |
| 2020/0022094 A1* | 1/2020 | You | ............... | H04W 72/21 |
| 2020/0092050 A1 | 3/2020 | Martin et al. | | |
| 2022/0015000 A1* | 1/2022 | Fujishiro | ............... | H04W 40/24 |

OTHER PUBLICATIONS

Huawei: "Prioritization of RLC Re-Transmissions", 3GPP TSG-RAN WG3 Meeting #81bis, R3-131664, Venice, Italy, Oct. 7-Oct. 11, 2013, Oct. 11, 2013 (Oct. 11, 2013) the Whole Document, 4 Pages.

International Search Report and Written Opinion—PCT/CN2021/103406—ISA/EPO—Aug. 30, 2021.

International Search Report and Written Opinion—PCT/CN2020/099238—ISA/EPO—Mar. 25, 2021.

* cited by examiner 700-a 700-b 700-c 800-a 800-b

ASSISTANCE SIGNALING FOR RADIO LINK CONTROL RETRANSMISSIONS

CROSS REFERENCE

The present Application is a 371 national stage filing of International PCT Application No. PCT/CN2021/103406 by Wu et al., entitled "ASSISTANCE SIGNALING FOR RADIO LINK CONTROL RETRANSMISSIONS," filed Jun. 30, 2021; and claims priority to International Patent Application No. PCT/CN2020/099238 by Wu et al., entitled "ASSISTANCE SIGNALING FOR RADIO LINK CONTROL RETRANSMISSIONS," filed Jun. 30, 2020, each of which is assigned to the assignee hereof, and each of which is expressly incorporated by reference in its entirety herein.

FIELD OF TECHNOLOGY

The following relates generally to wireless communications and more specifically to assistance signaling for radio link control (RLC) retransmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipments (UEs). Some wireless communications systems may support broadcast or multicast communications between wireless devices. In such systems, a transmitting device may broadcast or multicast data to one or more receiving devices, and the one or more receiving devices may monitor for the data from the transmitting device. In some cases, broadcast or multicast communications may utilize error correction schemes to improve the chances that broadcast or multicast data is received. Improved techniques for facilitating error correction for broadcast or multicast communications may be desirable.

SUMMARY

The described techniques relate to improved methods, systems, devices, and apparatuses that support assistance signaling for radio link control (RLC) retransmissions. Generally, the described techniques provide for sending, from an upper layer at a transmitting device to a lower layer at the transmitting device, an indication by which the lower layer determines that a packet is to be transmitted as either an initial transmission or as a retransmission. The lower layer at the transmitting device may then determine a transmission process for transmitting the packet based on the indication, and the transmitting device may transmit the packet in accordance with the transmission process. Because the lower layer may identify whether the packet is to be transmitted as either the initial transmission or the retransmission, the lower layer may adapt the transmission process to improve the chances that the packet is received by a receiving device or to limit overhead.

A method of wireless communication at a transmitting device is described. The method may include identifying a packet to be transmitted to a receiving device, sending, to a medium access control layer of the transmitting device from a higher layer control layer that is upstream of the medium access control layer of the transmitting device, an indication by which the medium access control layer determines that the packet is to be transmitted as either an initial transmission or as a retransmission, determining, at the medium access control layer of the transmitting device and based on the indication, a transmission process for transmission of the packet, and transmitting the packet to the receiving device in accordance with the transmission process.

An apparatus for wireless communication at a transmitting device is described. The apparatus may include a processor, memory coupled with the processor, and instructions stored in the memory. The instructions may be executable by the processor to cause the apparatus to identify a packet to be transmitted to a receiving device, send, to a medium access control layer of the transmitting device from a higher layer control layer that is upstream of the medium access control layer of the transmitting device, an indication by which the medium access control layer determines that the packet is to be transmitted as either an initial transmission or as a retransmission, determine, at the medium access control layer of the transmitting device and based on the indication, a transmission process for transmission of the packet, and transmit the packet to the receiving device in accordance with the transmission process.

Another apparatus for wireless communication at a transmitting device is described. The apparatus may include means for identifying a packet to be transmitted to a receiving device, sending, to a medium access control layer of the transmitting device from a higher layer control layer that is upstream of the medium access control layer of the transmitting device, an indication by which the medium access control layer determines that the packet is to be transmitted as either an initial transmission or as a retransmission, determining, at the medium access control layer of the transmitting device and based on the indication, a transmission process for transmission of the packet, and transmitting the packet to the receiving device in accordance with the transmission process.

A non-transitory computer-readable medium storing code for wireless communication at a transmitting device is described. The code may include instructions executable by a processor to identify a packet to be transmitted to a receiving device, send, to a medium access control layer of the transmitting device from a higher layer control layer that is upstream of the medium access control layer of the transmitting device, an indication by which the medium access control layer determines that the packet is to be transmitted as either an initial transmission or as a retransmission, determine, at the medium access control layer of the transmitting device and based on the indication, a transmission process for transmission of the packet, and transmit the packet to the receiving device in accordance with the transmission process.

In some examples of the method, apparatuses, and non-transitory computer-readable medium described herein, sending the indication to the medium access control layer may include operations, features, means, or instructions for sending the indication in a radio link control protocol data unit header, where the higher layer control layer may be a radio link control layer. In some examples of the method, apparatuses, and non-transitory computer-readable medium described herein, sending the indication in the radio link control protocol data unit header may include operations, features, means, or instructions for including a one-bit indication in the radio link control protocol data unit header, where the one-bit indication indicates whether the packet may be to be transmitted as either the initial transmission or as the retransmission.

In some examples of the method, apparatuses, and non-transitory computer-readable medium described herein, sending the indication in the radio link control protocol data unit header may include operations, features, means, or instructions for including a priority indication in the radio link control protocol data unit header, where the priority indication indicates a priority for the packet, and where the retransmission of the packet may have a higher priority than the initial transmission of the packet. In some examples of the method, apparatuses, and non-transitory computer-readable medium described herein, sending the indication to the medium access control layer may include operations, features, means, or instructions for sending the indication as a range of sequence numbers allocated for initial transmissions, where the higher layer control layer may be a radio resource control layer.

Some examples of the method, apparatuses, and non-transitory computer-readable medium described herein may further include operations, features, means, or instructions for determining, at the medium access control layer, that a sequence number of a radio link control protocol data unit including the packet may be within the range of sequence numbers allocated for initial transmissions, and determining that the packet may be to be transmitted in the initial transmission based at least in part the sequence number being within the range of sequence numbers allocated for initial transmissions. Some examples of the method, apparatuses, and non-transitory computer-readable medium described herein may further include operations, features, means, or instructions for determining, at the medium access control layer, that a sequence number of a radio link control protocol data unit including the packet may be outside the range of sequence numbers allocated for initial transmissions, and determining that the packet may be to be transmitted in the retransmission based on the sequence number being outside the range of sequence numbers allocated for initial transmissions.

In some examples of the method, apparatuses, and non-transitory computer-readable medium described herein, sending the indication to the medium access control layer may include operations, features, means, or instructions for sending the indication from a packet data convergence protocol layer to a radio link control layer and the medium access control layer, where the higher layer control layer may be the packet data convergence protocol layer. Some examples of the method, apparatuses, and non-transitory computer-readable medium described herein may further include operations, features, means, or instructions for prioritizing the packet at the radio link control layer based on the indication.

In some examples of the method, apparatuses, and non-transitory computer-readable medium described herein, sending the indication to the medium access control layer may include operations, features, means, or instructions for sending one or more priorities of logical channels to the medium access control layer, wherein the higher layer control layer is a radio resource control layer. Some examples of the method, apparatuses, and non-transitory computer-readable medium described herein may further include operations, features, means, or instructions for selecting a radio link control entity at a radio link control layer to which to send the packet from a packet data convergence protocol layer based at least in part on whether the packet is to be transmitted as either an initial transmission or as a retransmission and sending the packet from the packet data convergence protocol layer to the selected radio link control entity.

Some examples of the method, apparatuses, and non-transitory computer-readable medium described herein may further include operations, features, means, or instructions for receiving the packet in a logical channel from a radio link control layer and identifying, at the medium access control layer, a priority of the logical channel based at least in part on the one or more priorities of logical channels. In some examples of the method, apparatuses, and non-transitory computer-readable medium described herein, determining the transmission process for transmission of the packet may include operations, features, means, or instructions for determining whether the packet is to be transmitted in the initial transmission or the retransmission based at least in part on the priority of the logical channel.

In some examples of the method, apparatuses, and non-transitory computer-readable medium described herein, determining the transmission process for transmission of the packet may include operations, features, means, or instructions for determining, at the medium access control layer and from the indication, that the packet may be to be transmitted in the initial transmission, and determining, based on the packet being transmitted in the initial transmission, that the transmission process for transmission of the packet may be via a broadcast channel.

In some examples of the method, apparatuses, and non-transitory computer-readable medium described herein, determining the transmission process for transmission of the packet may include operations, features, means, or instructions for determining, at the medium access control layer and from the indication, that the packet may be to be transmitted in the retransmission, and determining, based on the packet being transmitted in the retransmission, that the transmission process for transmission of the packet may be via either a broadcast channel or a unicast channel. In some examples of the method, apparatuses, and non-transitory computer-readable medium described herein, transmitting the packet to the receiving device in accordance with the transmission process may include operations, features, means, or instructions for transmitting group-common downlink control information to schedule the initial transmission, where the packet may be to be transmitted in the initial transmission, and transmitting the packet in a shared channel to the receiving device based on transmitting the group-common downlink control information.

In some examples of the method, apparatuses, and non-transitory computer-readable medium described herein, transmitting the packet to the receiving device in accordance with the transmission process may include operations, features, means, or instructions for transmitting downlink control information in a UE-specific control channel to schedule the retransmission of the packet, where the packet may be to be transmitted in the retransmission, and transmitting the packet in a shared channel to the receiving device using beamforming based on transmitting the downlink control information. Some examples of the method, apparatuses, and non-transitory computer-readable medium described herein may further include operations, features, means, or instructions for encoding the packet for the initial transmission or the retransmission using a rateless code.

DETAILED DESCRIPTION

Figure 1:
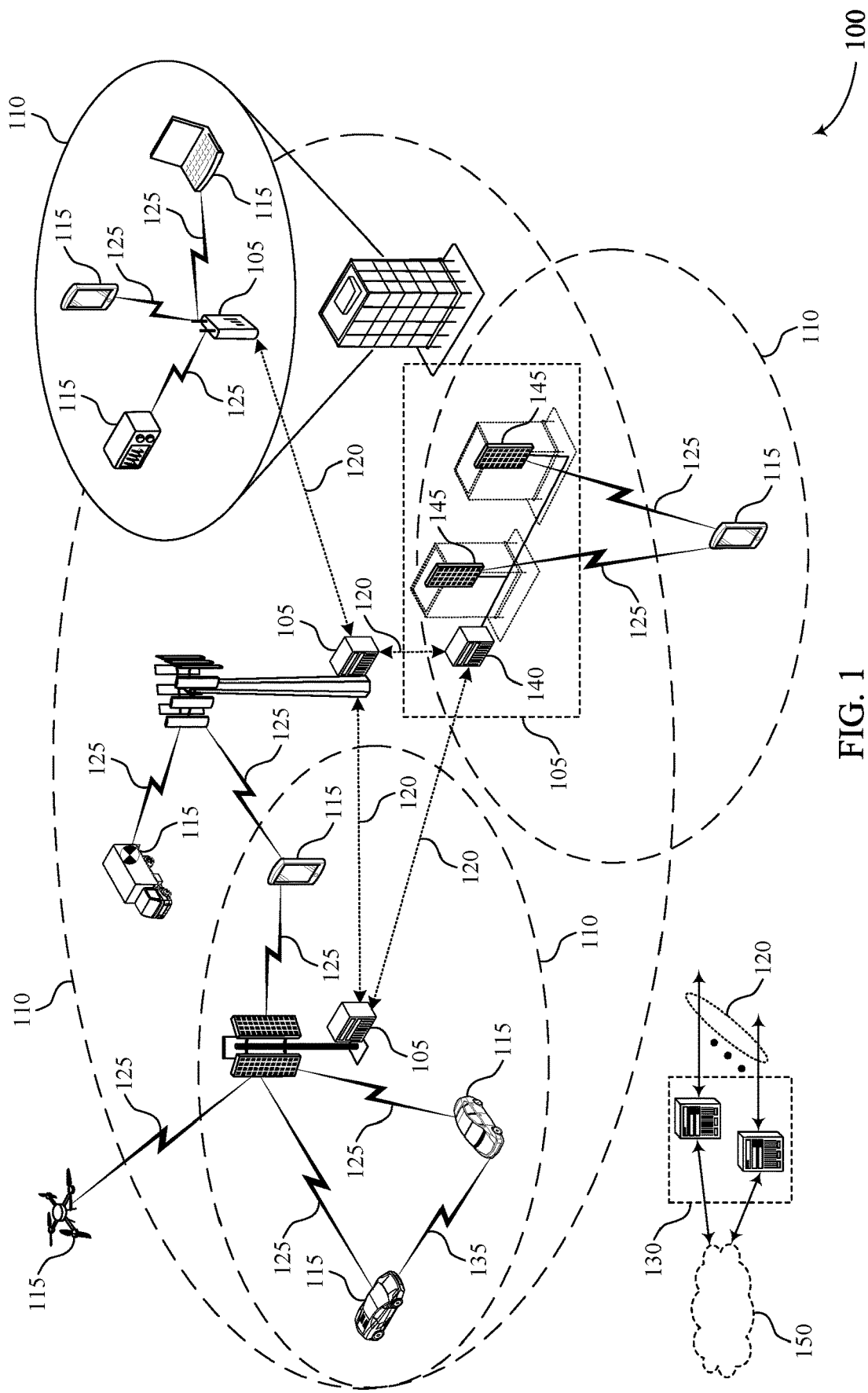
FIG. 1 illustrates an example of a wireless communications system that supports assistance signaling for radio link control (RLC) retransmissions in accordance with aspects of the present disclosure.

Some wireless communications systems may support broadcast or multicast services, where a transmitting device may transmit signals for reception by a group of receiving devices. In some cases, to improve reliability and latency, a wireless communications system may support error correction (e.g., forward error correction (FEC)) schemes for broadcast or multicast transmissions. For instance, at a physical layer, wireless devices may support a hybrid automatic repeat request (HARQ) scheme, where a receiving device may report feedback indicating whether data broadcast by a transmitting device was successfully received and decoded at the physical layer. If the receiving device failed to receive or decode the data, the transmitting device may rebroadcast the data to the receiving device. In some cases, it may not be efficient to correct all errors at low layers (e.g., the physical layer). Thus, a base station and a UE may also support an error correction scheme at a radio link control (RLC) layer. Such an error correction scheme may be referred to as RLC acknowledged mode (AM) and may be used to correct the residual errors of lower layers. Using RLC AM, a transmitting device may retransmit RLC protocol data units (PDUs) to receiving devices that failed to receive or decode the RLC PDUs.

In addition to supporting RLC AM, the transmitting device may encode a packet for transmission at the RLC layer or at a packet data convergence protocol (PDCP) layer. For instance, the transmitting device may encode the packet at the RLC or PDCP layer using a rateless code such as a fountain code. If the transmitting device encodes the packet at the RLC or PDCP layer, and the transmitting device utilizes RLC AM, the higher layers at the transmitting device (e.g., the PDCP layer and RLC layer) may be able to identify whether the packet is to be transmitted as an initial transmission or a retransmission. However, lower layers (e.g., a medium access control (MAC) layer and a physical layer) may be unable to identify whether the packet is to be transmitted as an initial transmission or a retransmission. As a result, a transmission process at the lower layers for an initial transmission and a retransmission may be the same, which may be detrimental to communications in a wireless communications system (e.g., may result in reduced reliability for retransmissions and unnecessary reliability and overhead for initial transmissions).

As described herein, a wireless communications system may support efficient techniques for facilitating initial transmissions and retransmissions. In particular, a transmitting device may send, from an upper layer at the transmitting device to a lower layer at the transmitting device, an indication by which the lower layer determines that a packet is to be transmitted as either an initial transmission or as a retransmission. In some cases, sending the indication from the upper layer to the lower layer may be based on encoding the packet using a rateless code. The lower layer at the transmitting device may then determine a transmission process for transmitting the packet based on the indication, and the transmitting device may transmit the packet in accordance with the transmission process. Because the lower layer may identify whether the packet is to be transmitted as either the initial transmission or the retransmission, the lower layer may adapt the transmission process to improve the chances that the packet is received by a receiving device or to limit overhead. Thus, the cross-layer scheduling at a transmitting device for a MAC layer or a physical layer may be improved by using the higher-layer indication of an initial (e.g., new) transmission or retransmission of an RLC layer (e.g., when a rateless code or other FEC is applied, especially for broadcast services).

Aspects of the disclosure introduced above are described below in the context of a wireless communications system. Examples of processes and signaling exchanges that support assistance signaling for RLC retransmissions are then described. Aspects of the disclosure are further illustrated by and described with reference to apparatus diagrams, system diagrams, and flowcharts that relate to assistance signaling for RLC retransmissions.

FIG. 1 illustrates an example of a wireless communications system 100 that supports assistance signaling for RLC retransmissions in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), FEC, and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

Figure 2:
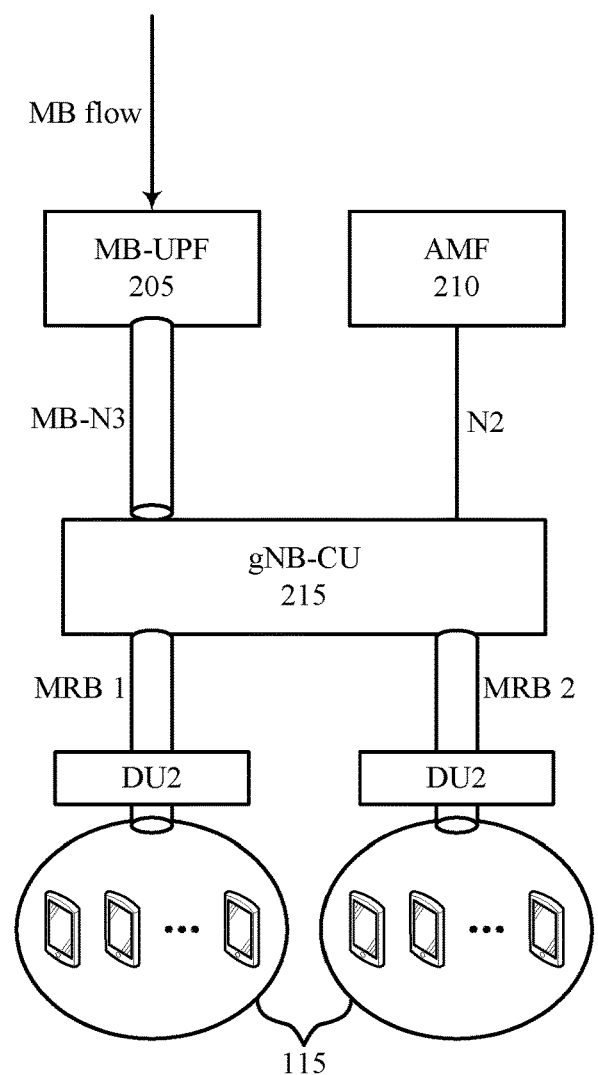
FIG. 2 illustrates an example of a flow of broadcast data from a base station to user equipments (UEs) in accordance with aspects of the present disclosure.

Wireless communications system 100 may support broadcast or multicast services, where a base station 105 may transmit signals for reception by a group of UEs 115. FIG. 2 illustrates an example of a flow 200 of broadcast data from a base station 105 to UEs 115 in accordance with aspects of the present disclosure. In the example of FIG. 2, a multicast broadcast (MB) user plane function (UPF) 205 may receive an MB quality of service (QoS) flow and may pass the MB flow over an MB-N3 tunnel to a base station control unit (CU) 215. MB-N3 may be a user plane interface for MB flow delivery over a general packet radio service (GPRS) tunneling protocol (GTP) (e.g., a tunneling protocol over the user data plane (UDP) or IP). The base station CU 215 may also receive control signaling for MB flow setup and modification over an N2 interface from an access and mobility management function (AMF) 210. The base station CU 215 may then map the MB flow to multicast radio bearers (MRBs) or dedicated radio bearers (DRBs) for transmission to UEs 115. In some cases, broadcast transmissions may be mixed with unicast transmissions in a physical downlink shared channel (PDSCH) (e.g., with LTE single cell point to multipoint (SC-PTM) as a baseline). That is, there may be close synergy between broadcast and unicast transmissions, including flexible switching between a DRB and MRB and unicast assistance to MRB in lower layers.

In some wireless systems (e.g., LTE systems), a base station may not support retransmission of broadcast data in a radio access network (RAN). One example of LTE broadcast is SC-PTM, where a single cell may broadcast signals over a PDSCH to a group of UEs 115, and the PDSCH may be identified by the group of UEs 115 based on a group radio network temporary identifier (G-RNTI) associated with the broadcast signals. In other systems (e.g., 5G systems), to improve reliability and latency, a base station 105 may support the retransmission of broadcast data in a RAN. In one example, a base station 105 and one or more UEs 115 may use a HARQ scheme to facilitate retransmissions of HARQ data. In some cases, however, it may not be efficient to correct all errors at low layers (e.g., using HARQ). Thus, a base station 105 and a UE 115 may also support an error correction scheme at an RLC layer. Such an error correction scheme may be referred to as RLC AM (ARQ).

In unicast communications, RLC AM may be used to correct the residual errors of lower layers. Similarly, in multicast or broadcast communications, RLC AM may be used to correct the residual errors of lower layers. For instance, the packet error rate (PER) of a single physical transmission without retransmission may be approximately 0.1, the PER using HARQ in the physical or MAC layer may be approximately 0.0001~0.001, and the PER using RLC AM may be 0~0.000001. The RLC AM techniques for unicast communications may be enhanced for broadcast or multicast communications. For instance, a receiving device may send an RLC status report (e.g., including an ACK or NACK) over unicast (e.g., with a cell-specific radio network temporary identifier (C-RNTI)), and a transmitting device may retransmit lost PDUs over either broadcast (e.g., with a group-specific radio network temporary identifier (G-RNTI)) or unicast (e.g., with a C-RNTI). In some cases, RLC AM may utilize sliding window-based flow control (e.g., to determine which PDUs to retransmit). For instance, flow control may be supported for packets within a sliding window, and the sliding window may advance as new packets are transmitted.

In addition to supporting RLC AM, a transmitting device may encode a packet for transmission at the RLC layer or at a PDCP layer. For instance, the transmitting device may encode the packet at the RLC or PDCP layer using a fountain code. Fountain codes may be rateless codes whose generator matrix may have unlimited columns. Fountain codes may be rateless in the sense that coded packets are potentially limitless. The transmitted packets may be recovered by a receiver as long as the number of received packets is slightly larger than that of the source packets, regardless of which packets are received. The Luby transform (LT) code is the first fountain code, and the raptor code is an enhancement of the LT code (e.g., the raptor code is roughly equivalent to a low-density parity check (LDCP) code plus a weak LT code). Fountain codes may be generally referred to as network codes because these codes may be applied at the network layer. In 4G LTE, a raptor code may be applied for multimedia broadcast/multicast service (MBMS). In some cases, network codes may be used for integrated access and backhaul (IAB).

Figure 3:
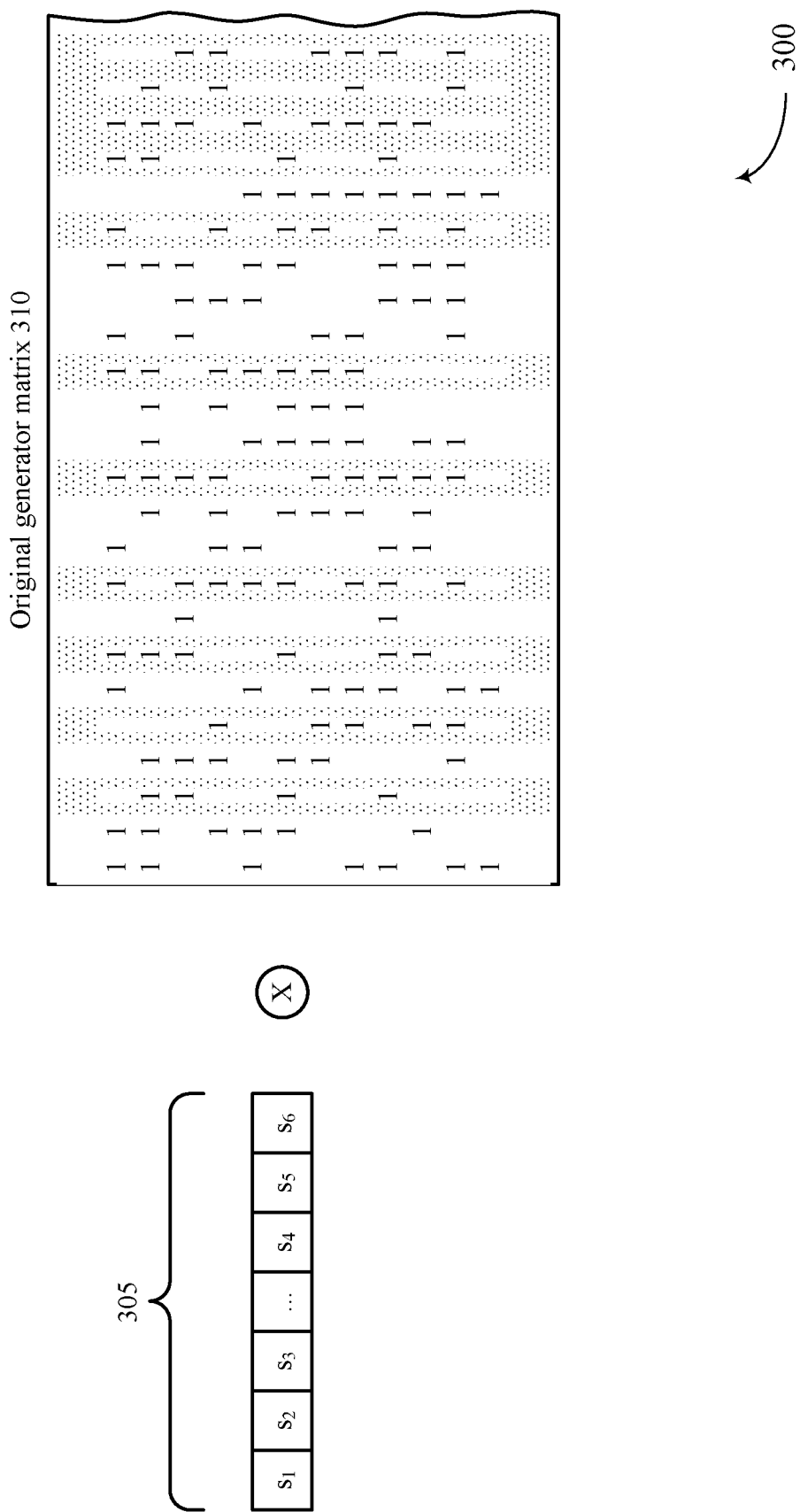
FIG. 3 illustrates an example of fountain coding in accordance with aspects of the present disclosure.

FIG. 3 illustrates an example of fountain coding 300 in accordance with aspects of the present disclosure. Performing fountain coding may involve a transmitting device dividing an RLC service data unit (SDU) into K data blocks 305 (i.e., $s_1, \ldots, s_K$), where each of the data blocks 305 may contain a same number of bits. The transmitting device may then encode the K data blocks 305 into J packets $p_1, \ldots, p_J$ using a mother generator matrix 310. For instance, the encoding device may determine each of the J packets as $p_j = \Sigma_{k=1}^{K} s_k G_{kj}$, where $G_{kj}$ may represent a value of an entry at a kth row and a jth column of the mother generator matrix G. Each of the J packets may correspond to a different column of the mother generator matrix 310.

Figure 4:
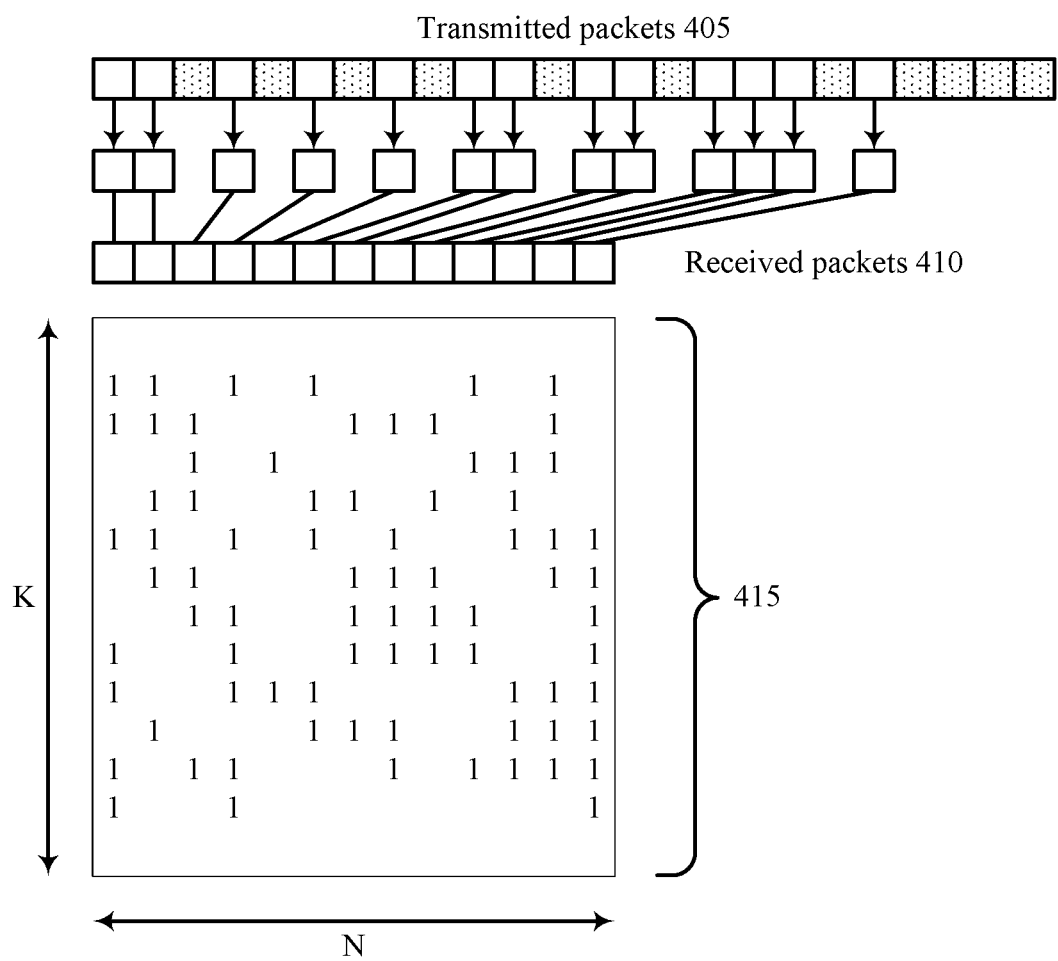
FIG. 4 illustrates an example of packets produced using fountain coding in accordance with aspects of the present disclosure.

FIG. 4 illustrates an example of packets 400 produced using fountain coding in accordance with aspects of the present disclosure. The J packets may correspond to transmitted packets 405, and a transmitting device may transmit the J packets 405 to a receiving device. When the receiving device receives a fountain encoded transmission from the transmitting device, the receiving device may receive at least some of the J packets 405 (e.g., N packets 410, where N≤J). Assuming that the number of N packets 410 successfully received is greater than a threshold amount (e.g., greater than K), the decoding device may construct an invertible generator matrix $G^{-1}$ 415 from the N packets 410. For instance, the decoding device may identify a header for a first of the N packets 410 and may identify, from the header, a column of the mother generator matrix G. The decoding device may perform this identification and may construct the invertible generator matrix 415 by mapping each of the identified columns of the mother generator matrix G to a column of the invertible generator matrix $G^{-1}$ 415.

Once the decoding device generates the invertible generator matrix $G^{-1}$ 415, the decoding device may reconstruct the K data blocks based on the invertible generator matrix $G^{-1}$ 415. For instance, if each of the K recovered data blocks are denoted by $d_k$, where 0<k≤K, and each of the packets is denoted by $p_n$, where 0<n≤N, then $d_k$ may be equal to $\Sigma_{n=1}^{N} p_n G_{nk}^{-1}$, where $G_{nk}^{-1}$ may represent a qth row and a kth column of the inverted generator matrix $G^{-1}$. Generally, the data blocks may be recovered if generator matrix G according to the N data blocks (e.g., the received packets) is invertible or if the rank of invertible generator matrix $G^{-1}$ is K. Further, the original generator matrix may be designed such that $G_{nk}$ is invertible with a minimum value of N. For conventional ARQ, the original generator matrix may start with a unit matrix.

Figure 5:
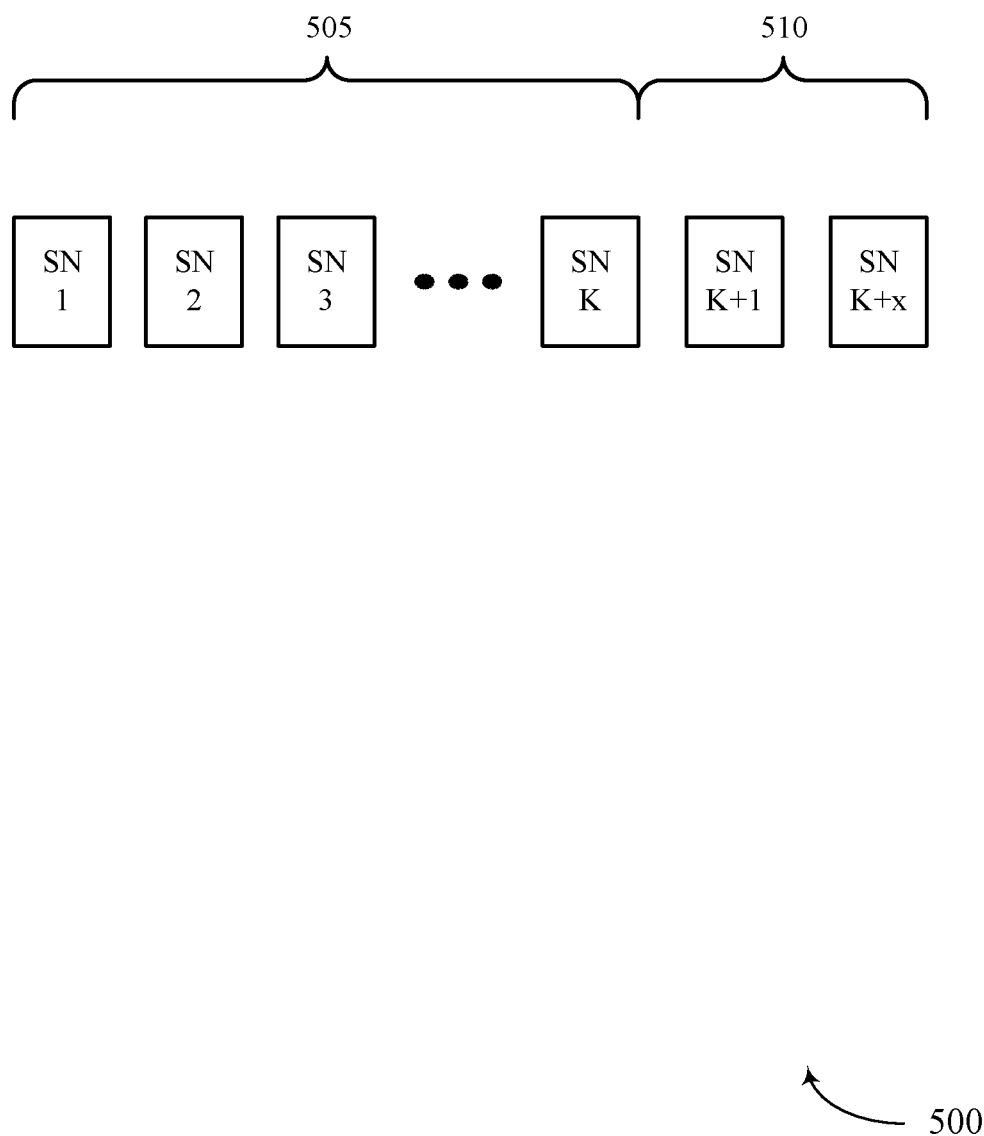
FIG. 5 illustrates an example of transmitted packets in accordance with aspects of the present disclosure.

In wireless communications system 100, a transmitting device may use fountain codes as described above to encode packets at an RLC layer or PDCP layer for transmission to a receiving device. Some transmissions may be initial (e.g., new) transmissions and other transmissions may be retransmissions. FIG. 5 illustrates an example of transmitted packets 500 in accordance with aspects of the present disclosure. In the example of FIG. 5, a transmitting device may transmit a first set of packets 505 as initial transmissions and a second set of packets 510 as retransmissions. If the transmitting device encodes each packet at the RLC or PDCP layer, and the transmitting device utilizes RLC AM, the higher layers at the transmitting device may be able to identify whether the packet is to be transmitted as an initial transmission or a retransmission. However, lower layers (e.g., MAC and physical layers) may be unable to identify whether each packet is to be transmitted as an initial transmission or a retransmission.

For instance, a MAC layer may not be aware of whether a packet received from an RLC layer is to be transmitted as an initial transmission or retransmission. In particular, the MAC layer may not be able to identify a sequence number or other information related to packet segmentation, and the MAC layer may not be able to identify whether an RLC packet with FEC (e.g., encoded with a rateless code) is for an initial transmission or retransmission. As a result, a transmission process at the lower layers for an initial transmission and a retransmission may be the same. The transmission process may refer to a type of transmission (e.g., unicast, multicast, groupcast, or broadcast), resources used for a transmission, a configuration used for a transmission, etc. If a same transmission process is used for initial transmissions and retransmissions, there may be reduced reliability for retransmissions and unnecessary reliability and overhead for initial transmissions.

Thus, if RLC AM is used with FEC, and a retransmission of error correction packets is requested, it may be appropriate to indicate to a MAC layer whether a packet is to be transmitted as an initial transmission or retransmission. That is, cross-layer optimization may be appropriate to indicate to a MAC layer whether a packet generated at the RLC layer is to be transmitted as an initial transmission or retransmission.

Wireless communications system 100 may support efficient techniques for facilitating initial transmissions and retransmissions of packets from a transmitting device to a receiving device. In particular, a transmitting device may send, from an upper layer at the transmitting device to a lower layer at the transmitting device, an indication by which the lower layer determines that a packet is to be transmitted as either an initial transmission or as a retransmission. In one example, the MAC layer may then use a broadcast channel or group common downlink control information (DCI) and a PDSCH for an initial transmission of a packet, and the MAC layer may use UE-specific physical downlink control channel (PDCCH) triggering and a PDSCH with beamforming for a retransmission of a packet (e.g., to retransmit blocks of an RLC layer).

Figure 6:
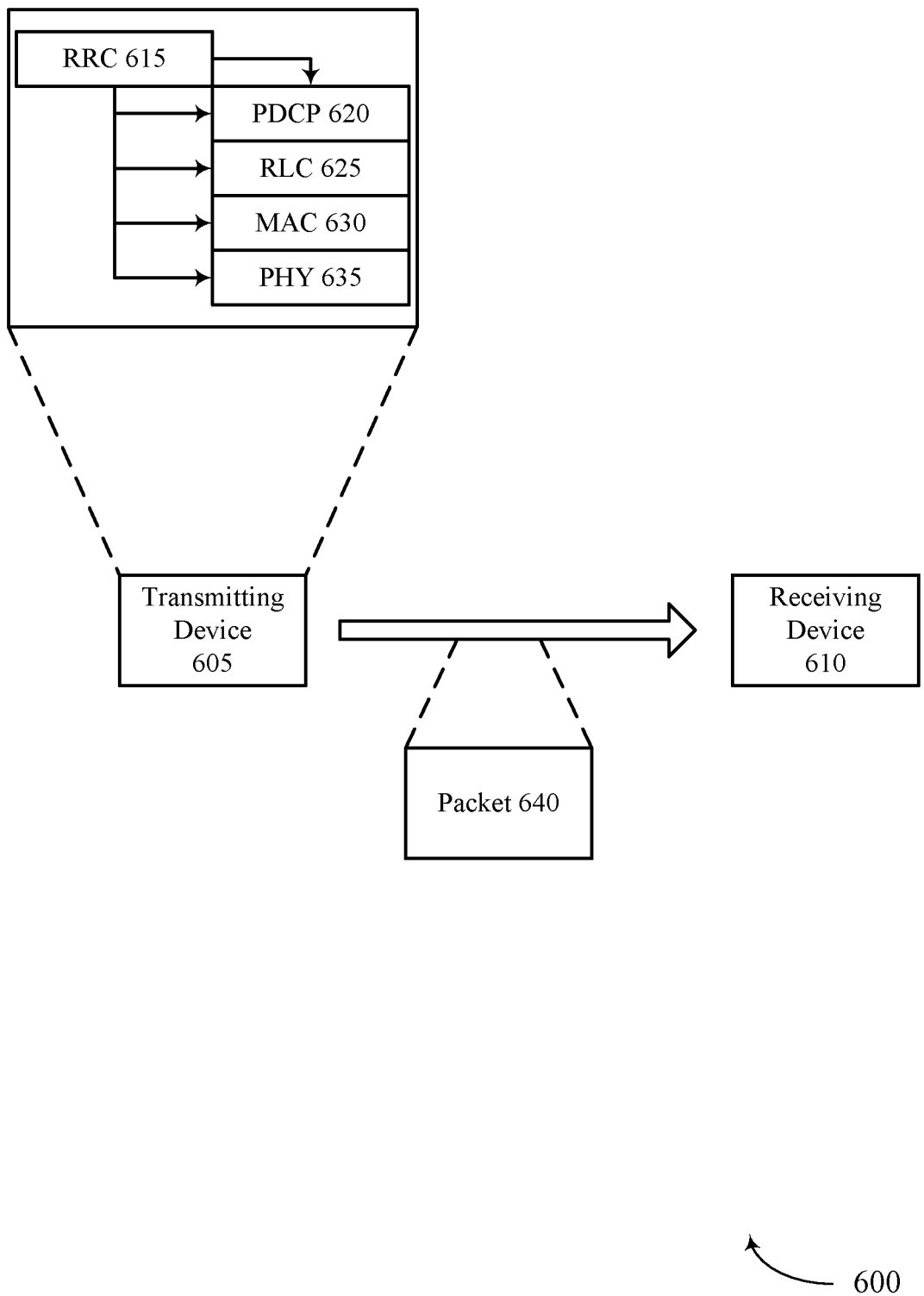
FIG. 6 illustrates an example of a wireless communications system that supports assistance signaling for RLC retransmissions in accordance with aspects of the present disclosure.

FIG. 6 illustrates an example of a wireless communications system 600 that supports assistance signaling for RLC retransmissions in accordance with aspects of the present disclosure. The wireless communications system 600 includes a transmitting device 605, which may be an example of a base station 105 or a UE 115 described with reference to FIGS. 1-5. The wireless communications system 600 also includes a receiving device 610, which may be an example of a UE 115 or a base station 105 described with reference to FIGS. 1-5. The transmitting device 605 may include an RRC layer 615, a PDCP layer 620, an RLC layer 625, a MAC layer 630, and a physical (PHY) layer 635. Although not shown, the receiving device 610 may also include similar layers. The wireless communications system 600 may implement aspects of wireless communications system 100. For example, the wireless communications system 600 may support efficient techniques for facilitating initial transmissions and retransmissions of packets from the transmitting device 605 to the receiving device 610.

The transmitting device 605 may generate a packet 640 at the PDCP layer 620 or the RLC layer 625. For instance, the transmitting device 605 may encode the packet 640 using a fountain code (or other rateless code) at the PDCP layer 620 or the RLC layer 625. In one aspect, if the transmitting device 605 generates the packet 640 at the RLC layer 625, the transmitting device 605 may send, from the RLC layer 625 to the MAC layer 630, an indication by which the MAC layer 630 determines that the packet 640 is to be transmitted as either an initial transmission or a retransmission. In another aspect, if the transmitting device 605 generates the packet 640 at the PDCP layer 620, the transmitting device 605 may send, from the PDCP layer 620 to the RLC layer 625, the MAC layer 630, or both, an indication by which the RLC layer 625 or the MAC layer 630 determines that the packet 640 is to be transmitted as either an initial transmission or a retransmission. In yet another aspect, the transmitting device 605 may send, from the RRC layer 615 to the PDCP layer 620, the MAC layer 630, or both, the indication by which the PDCP layer 620, the MAC layer 630, or both determines that the packet 640 is to be transmitted as either an initial transmission or a retransmission. The transmitting device 605 may then determine, at the MAC layer 630, a transmission process for transmitting the packet 640 based on the indication.

In one aspect, the transmitting device 605 may determine, at the MAC layer and from the indication, that the packet is to be transmitted in an initial transmission. In this aspect, the transmitting device 605 may determine that the transmission process for transmission of the packet 640 is via a broadcast channel. That is, the transmitting device 605 may broadcast the packet 640 if the packet 640 is to be transmitted in an initial transmission. Additionally, or alternatively, the transmitting device 605 may transmit group-common DCI to schedule the initial transmission, and the transmitting device 605 may transmit the packet 640 in a shared channel (e.g., PDSCH) to the receiving device 610 based on transmitting the group-common DCI. The transmitting device 605 may determine to broadcast the packet 640 to allow multiple receiving devices to receive the packet 640.

In another aspect, the transmitting device 605 may determine, at the MAC layer 630 and from the indication, that the packet is to be transmitted in a retransmission. In this aspect, the transmitting device 605 may determine that the transmission process for transmission of the packet 640 is via either a broadcast channel or a unicast channel. That is, the transmitting device 605 may potentially unicast the packet 640 (e.g., to a specific receiving device) if the packet 640 is to be transmitted in a retransmission. Additionally, or alternatively, the transmitting device 605 (e.g., a base station 105) may transmit DCI in a UE-specific control channel to schedule the retransmission of the packet, and the transmitting device 605 may transmit the packet 640 in a shared channel to the receiving device 610 using beamforming based on transmitting the DCI. The transmitting device 605 may determine to unicast the packet 640 improve the chances that a receiving device that failed to receive one or more previous transmissions of the packet 640 is able to receive the packet 640.

Thus, the transmitting device may use the indication to determine a transmission process at a MAC layer for transmitting the packet 640. In some cases, if the packet is generated at the PDCP layer 620, and the PDCP layer 620 indicates to the RLC layer 625 whether the packet is to be transmitted in an initial transmission or retransmission, the RLC layer 625 may also configure (e.g., send) the packet for transmission based on the indication. For instance, the RLC layer 625 may treat initial (or new) transmissions and retransmissions with different priorities and pass retransmissions with higher priority to the MAC layer 630. That is, the transmitting device 605 may prioritize the packet at the RLC layer 625 based on the indication. The RLC layer 625 may then send the indication to the MAC layer 630. Alternatively, the PDCP layer 620 may send the indication to the MAC layer 630.

Figure 7:
FIG. 7 illustrates examples of different techniques at a transmitting device for sending, from an upper layer to a lower layer, an indication by which the lower layer determines that a packet is to be transmitted as either an initial transmission or a retransmission in accordance with aspects of the present disclosure.
Figure 7:
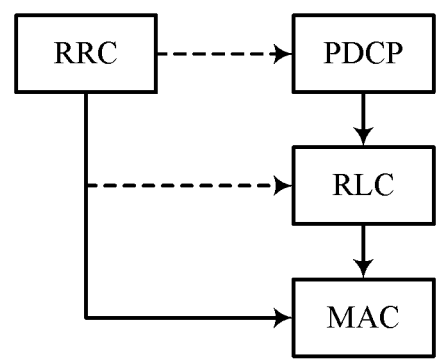
Figure 7:

FIG. 7 illustrates examples of different techniques 700 at a transmitting device for sending, from an upper layer to a lower layer, an indication by which the lower layer determines that a packet is to be transmitted as either an initial transmission or a retransmission in accordance with aspects of the present disclosure. The transmitting device may send the indication from an RLC layer to a MAC layer, from a PDCP layer to an RLC layer, MAC layer, or both, or from an RRC layer to a PDCP layer, MAC layer, or both. That is, the upper layer may be an RRC layer, a PDCP layer, or an RLC layer, and the lower layer may be an RLC layer or a MAC layer.

In a first example 700-*a*, the transmitting device may send, from an RLC layer to a MAC layer, a one-bit indication in an RLC PDU header of an RLC PDU that includes the packet. Additionally, or alternatively, the transmitting device may send, from a PDCP layer to a MAC layer, a one-bit indication in a PDCP PDU header of a PDCP PDU that includes the packet. That is, a one-bit indication may be added in an RLC PDU header or PDCP PDU header that indicates that the packet included in the PDU is to be transmitted in an initial transmission or a retransmission (e.g., a new or retransmitted version for RLC with FEC).

In a second example 700-b, the transmitting device may send, from an RRC layer to a MAC layer, a range of sequence numbers allocated for initial transmissions. That is, the RRC layer may signal to the MAC layer a range of sequence numbers for RLC PDUs to be transmitted in new transmissions. The MAC layer may then read each RLC PDU to determine whether the RLC PDU is to be transmitted in an initial transmission or a retransmission (e.g., a new or retransmitted version for RLC with FEC). If the transmitting device determines, at the MAC layer, that a sequence number of an RLC PDU including the packet is within the range of sequence numbers allocated for initial transmissions, the transmitting device may determine that the packet is to be transmitted in an initial transmission. If the transmitting device determines, at the MAC layer, that a sequence number of an RLC PDU including the packet is outside the range of sequence numbers allocated for initial transmissions, the transmitting device may determine that the packet is to be transmitted in a retransmission. The RRC layer may also send the indication from the RRC layer to an RLC layer, a PDCP layer, or both.

In a third example 700-c, the transmitting device may send, from an RLC layer to a MAC layer, a priority indication in an RLC PDU header of an RLC PDU that includes the packet. Additionally, or alternatively, the transmitting device may send, from a PDCP layer to a MAC layer, a priority indication in a PDCP PDU header of a PDCP PDU that includes the packet. That is, a priority indication (e.g., indicating one priority level of multiple levels of priority) may be added in an RLC PDU header or PDCP PDU header that indicates that the packet included in the PDU is to be transmitted in an initial transmission or a retransmission (e.g., for cross-layer scheduling assistance). A retransmission of a packet may have a higher priority than an initial transmission of the packet.

Figure 8:
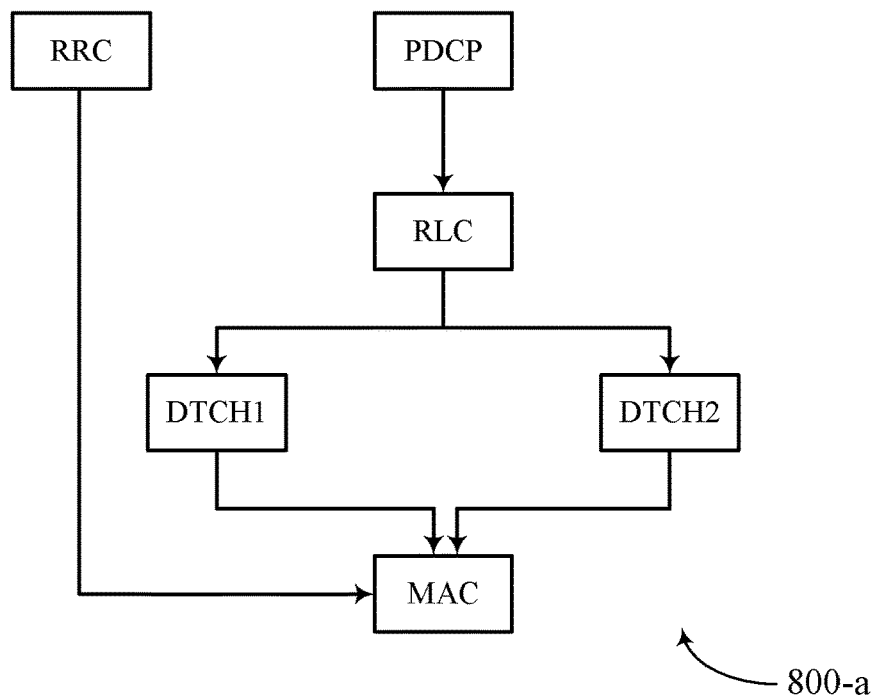
FIG. 8 illustrates examples of techniques at a transmitting device for sending, from an upper layer to a lower, an indication by which the lower layer determines that a packet is to be transmitted as either an initial transmission or a retransmission in accordance with aspects of the present disclosure.
Figure 8:
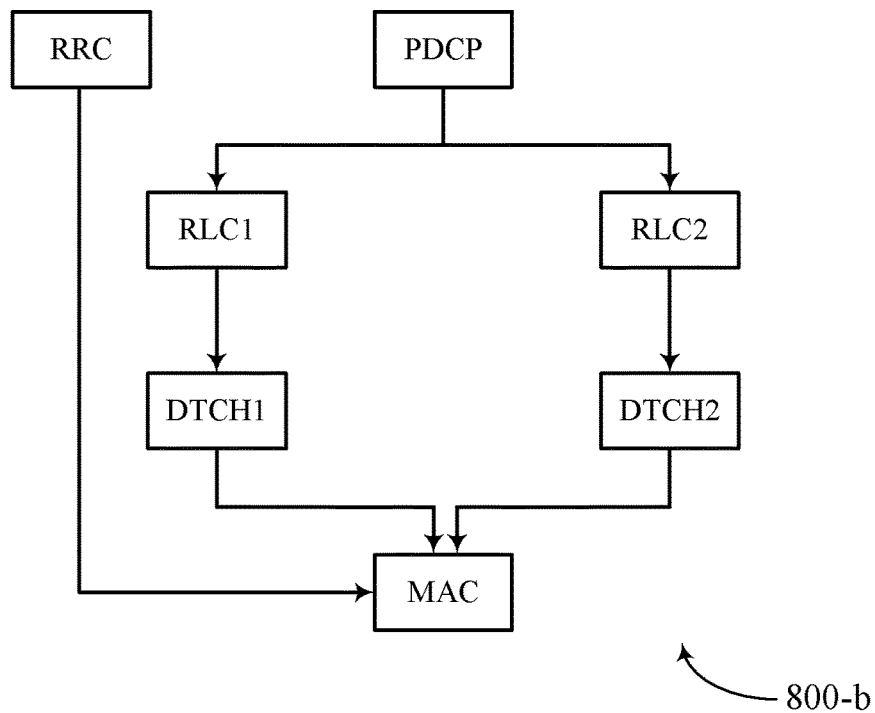

FIG. 8 illustrates examples of techniques at a transmitting device for sending, from an upper layer to a lower layer, an indication by which the lower layer determines that a packet is to be transmitted as either an initial transmission or a retransmission in accordance with aspects of the present disclosure. The transmitting device may send the indication from an RLC layer to a MAC layer, from a PDCP layer to an RLC layer, MAC layer, or both, or from an RRC layer to a PDCP layer, MAC layer, or both. That is, the upper layer may be an RRC layer, a PDCP layer, or an RLC layer, and the lower layer may be an RLC layer or a MAC layer.

In a first example 800-a, the transmitting device may send, from an RLC layer to a MAC layer, data (e.g., a packet) in a logical channel based on whether the data is for an initial transmission or a retransmission. That is, the RLC layer may output encoded data to multiple logical channels, and different logical channels (e.g., dedicated traffic channels (DTCHs)) may be used to carry initial (e.g., new) transmissions and retransmissions. For example, if the RLC layer sends data (e.g., a packet or PDU) to the MAC layer in DTCH1, and DTCH1 is used to carry initial transmissions, the MAC layer may determine that the data received from the RLC layer in DTCH1 is to be transmitted in an initial transmission. Alternatively, if the RLC layer sends data to the MAC layer in DTCH2, and DTCH2 is used to carry retransmissions, the MAC layer may determine that the data received from the RLC layer in DTCH2 is to be transmitted in a retransmission.

In a second example 800-b, the transmitting device may send, from a PDCP layer, data to an RLC entity based on whether the data is for an initial transmission or a retransmission. That is, different RLC entities may be used to handle initial transmissions and retransmissions. Accordingly, the PDCP layer may send data to be transmitted in an initial transmission to a first RLC entity (e.g., RLC1) used to handle initial transmissions, and the PDCP layer may send data to be transmitted in retransmissions to a second RLC entity (e.g., RLC2) used to handle retransmissions. Thus, new and retransmitted data may be split into different RLC entities. In some cases, each RLC entity may pass data to a specific DTCH. For example, the first RLC entity (e.g., RLC1) may send data to the MAC layer in a first DTCH (e.g., DTCH1), and the second RLC entity (e.g., RLC2) may send data to the MAC layer in a second DTCH (e.g., DTCH2). In such cases, if RLC1 sends data (e.g., a packet or PDU) to the MAC layer in DTCH1, and DTCH1 is used to carry initial transmissions (e.g., since RLC1 may be used to handle initial transmissions), the MAC layer may determine that the data received from the RLC layer in DTCH1 is to be transmitted in an initial transmission. Alternatively, if RLC2 sends data to the MAC layer in DTCH2, and DTCH2 is used to carry retransmissions (e.g., since RLC2 may be used to handle retransmissions), the MAC layer may determine that the data received from the RLC layer in DTCH2 is to be transmitted in a retransmission.

In some cases, different priorities may be assigned to different logical channels. In such cases, different priorities for the different logical channels may be assigned to the MAC layer (i.e., the MAC layer may be configured with the priorities for different DTCHs), and the MAC layer may read different DTCHs and attempt to prioritize new and retransmitted data. For instance, the RRC layer may send an indication of one or more priorities of logical channels to the MAC layer, and the MAC layer may determine which DTCHs include initial transmissions and which DTCHs include retransmissions based on the priorities of the DTCHs. Thus, the MAC layer may be able to identify the priorities of different DTCHs, and the MAC layer may use these priorities to identify data to be transmitted in initial transmissions and retransmissions. For example, the MAC layer may receive data from the RLC layer in a first DTCH, and the MAC layer may determine to transmit the data in the first DTCH in an initial transmission based on a priority of the first DTCH. Similarly, the MAC layer may receive data from the RLC layer in a second DTCH, and the MAC layer may determine to transmit the data in the second DTCH in a retransmission based on a priority of the second DTCH.

Figure 9:
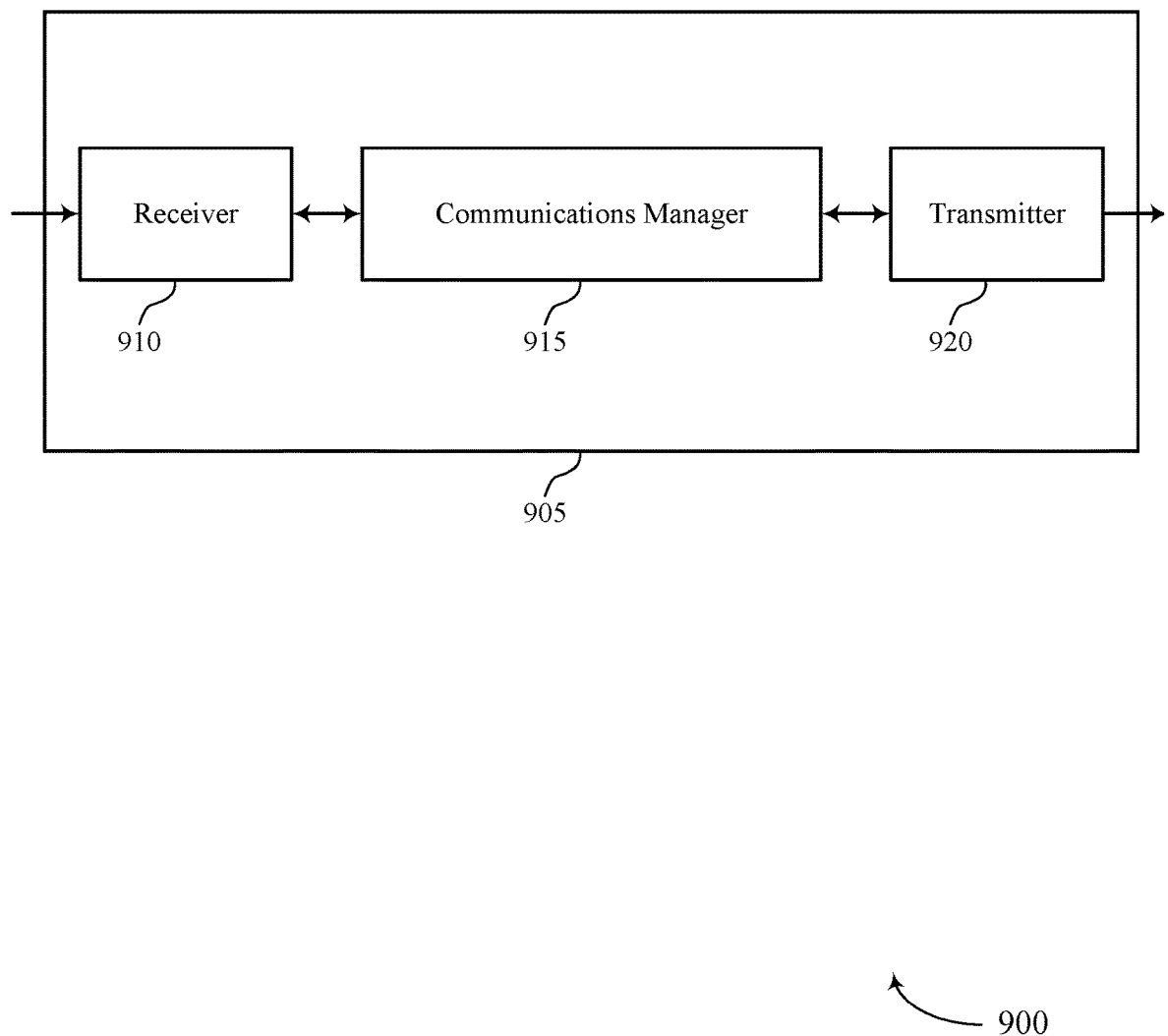
FIGS. 9 and 10 show block diagrams of devices that support assistance signaling for RLC retransmissions in accordance with aspects of the present disclosure.

FIG. 9 shows a block diagram 900 of a device 905 that supports assistance signaling for RLC retransmissions in accordance with aspects of the present disclosure. The device 905 may be an example of aspects of a UE 115 or base station 105 as described herein. The device 905 may include a receiver 910, a communications manager 915, and a transmitter 920. The device 905 may also include a processor. Each of these components may be in communication with one another (e.g., via one or more buses).

Receiver 910 may receive information such as packets, user data, or control information associated with various information channels (e.g., control channels, data channels, and information related to assistance signaling for RLC retransmissions, etc.). Information may be passed on to other components of the device 905. The receiver 910 may be an example of aspects of the transceiver 1220 or 1320 as described with reference to FIGS. 12 and 13. The receiver 910 may utilize a single antenna or a set of antennas.

The communications manager 915 may identify a packet to be transmitted to a receiving device, transmit the packet to the receiving device in accordance with the transmission process, send, to a medium access control layer of the transmitting device from a higher layer control layer that is upstream of the medium access control layer of the transmitting device, an indication by which the medium access control layer determines that the packet is to be transmitted as either an initial transmission or as a retransmission, and determine, at the medium access control layer of the transmitting device and based on the indication, a transmission process for transmission of the packet. The communications manager 915 may be an example of aspects of the communications manager 1210 or 1310 as described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 920 may transmit signals generated by other components of the device 905. In some examples, the transmitter 920 may be collocated with a receiver 910 in a transceiver module. For example, the transmitter 920 may be an example of aspects of the transceiver 1220 or 1320 as described with reference to FIGS. 12 and 13. The transmitter 920 may utilize a single antenna or a set of antennas.

Figure 10:
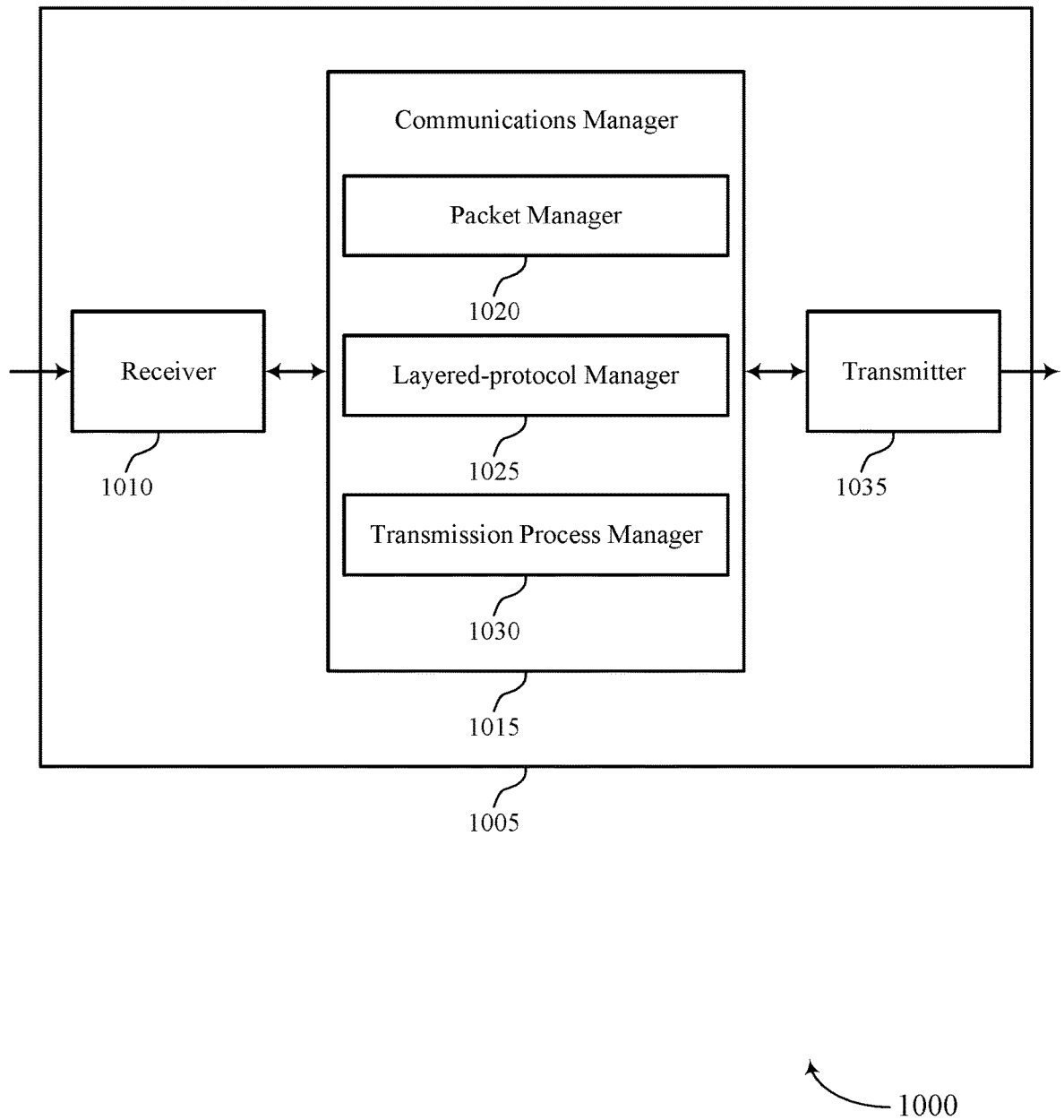

FIG. 10 shows a block diagram 1000 of a device 1005 that supports assistance signaling for RLC retransmissions in accordance with aspects of the present disclosure. The device 1005 may be an example of aspects of a device 905, a UE 115, or a base station 105 as described herein. The device 1005 may include a receiver 1010, a communications manager 1015, and a transmitter 1035. The device 1005 may also include a processor. Each of these components may be in communication with one another (e.g., via one or more buses).

Receiver 1010 may receive information such as packets, user data, or control information associated with various information channels (e.g., control channels, data channels, and information related to assistance signaling for RLC retransmissions, etc.). Information may be passed on to other components of the device 1005. The receiver 1010 may be an example of aspects of the transceiver 1220 or 1320 as described with reference to FIGS. 12 and 13. The receiver 1010 may utilize a single antenna or a set of antennas.

The communications manager 1015 may be an example of aspects of the communications manager 915 as described herein. The communications manager 1015 may include a packet manager 1020, a layered-protocol manager 1025, and a transmission process manager 1030. The communications manager 1015 may be an example of aspects of the communications manager 1210 or 1310 as described herein.

The packet manager 1020 may identify a packet to be transmitted to a receiving device. The layered-protocol manager 1025 may send, to a medium access control layer of the transmitting device from a higher layer control layer that is upstream of the medium access control layer of the transmitting device, an indication by which the medium access control layer determines that the packet is to be transmitted as either an initial transmission or as a retransmission. The transmission process manager 1030 may determine, at the medium access control layer of the transmitting device and based on the indication, a transmission process for transmission of the packet. The packet manager 1020 may transmit the packet to the receiving device in accordance with the transmission process Transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 or 1320 as described with reference to FIGS. 12 and 13. The transmitter 1035 may utilize a single antenna or a set of antennas.

Figure 11:
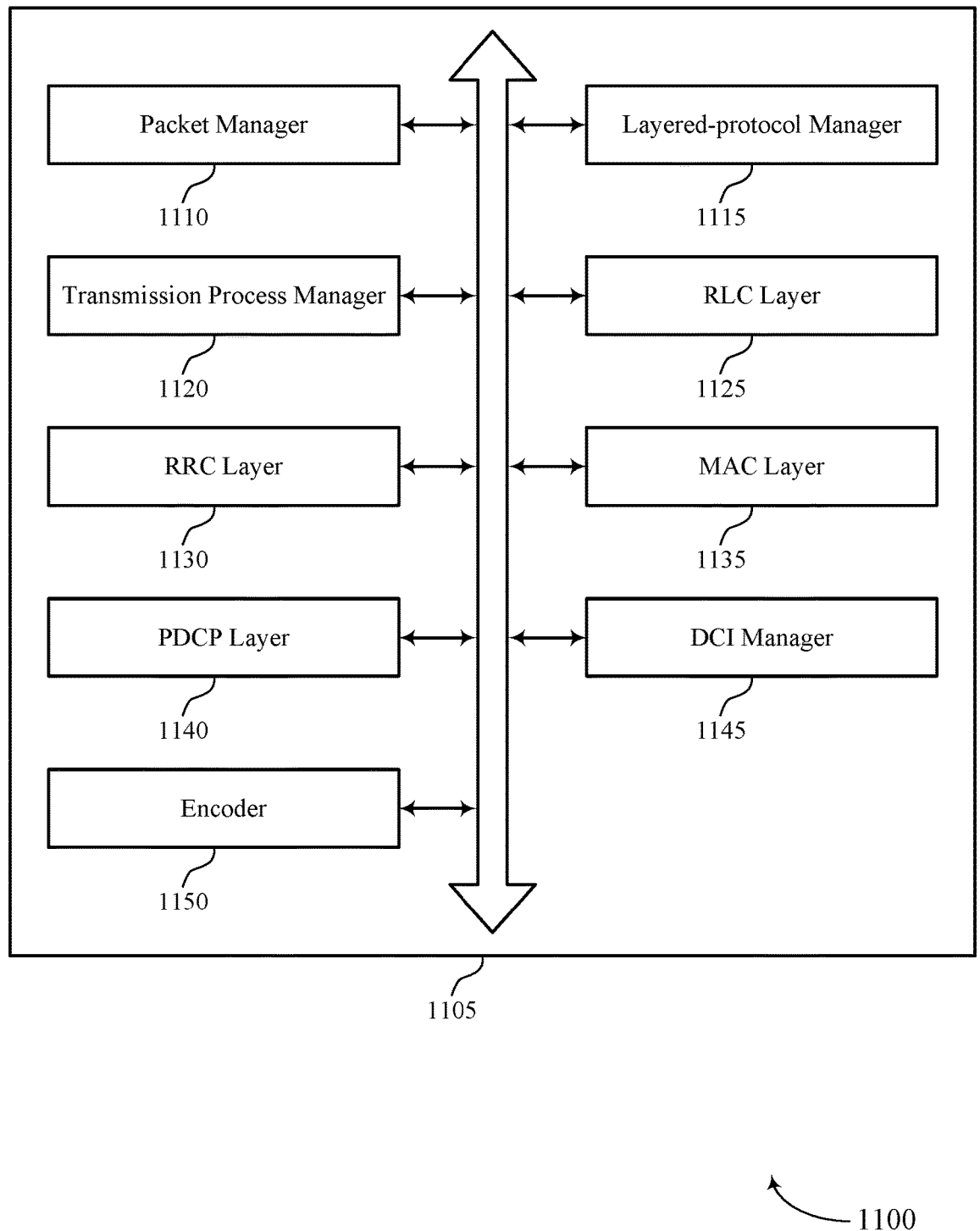
FIG. 11 shows a block diagram of a communications manager that supports assistance signaling for RLC retransmissions in accordance with aspects of the present disclosure.

FIG. 11 shows a block diagram 1100 of a communications manager 1105 that supports assistance signaling for RLC retransmissions in accordance with aspects of the present disclosure. The communications manager 1105 may be an example of aspects of a communications manager 915, a communications manager 1015, a communications manager 1210, or a communications manager 1310 described herein. The communications manager 1105 may include a packet manager 1110, a layered-protocol manager 1115, a transmission process manager 1120, a RLC layer 1125, a RRC layer 1130, a MAC layer 1135, a PDCP layer 1140, a DCI manager 1145, and an encoder 1150. Each of these modules may communicate, directly or indirectly, with one another (e.g., via one or more buses).

The packet manager 1110 may identify a packet to be transmitted to a receiving device. The layered-protocol manager 1115 may send, to a medium access control layer of the transmitting device from a higher layer control layer that is upstream of the medium access control layer of the transmitting device, an indication by which the medium access control layer determines that the packet is to be transmitted as either an initial transmission or as a retransmission. The transmission process manager 1120 may determine, at the medium access control layer of the transmitting device and based on the indication, a transmission process for transmission of the packet. The packet manager 1110 may then transmit the packet to the receiving device in accordance with the transmission process.

The RLC layer 1125 may send the indication in a radio link control protocol data unit header, where the higher layer control layer is a radio link control layer. In some examples, the RLC layer 1125 may include a one-bit indication in the radio link control protocol data unit header, where the one-bit indication indicates whether the packet is to be transmitted as either the initial transmission or as the retransmission. In some examples, the RLC layer 1125 may include a priority indication in the radio link control protocol data unit header, where the priority indication indicates a priority for the packet, and where the retransmission of the packet has a higher priority than the initial transmission of the packet.

The RRC layer 1130 may send the indication as a range of sequence numbers allocated for initial transmissions, where the higher layer control layer is a radio resource control layer. The MAC layer 1135 may determine, at the medium access control layer, that a sequence number of a radio link control protocol data unit including the packet is within the range of sequence numbers allocated for initial transmissions. In some examples, the MAC layer 1135 may determine that the packet is to be transmitted in the initial transmission based at least in part the sequence number being within the range of sequence numbers allocated for initial transmissions. In some examples, the MAC layer 1135 may determine, at the medium access control layer, that a sequence number of a radio link control protocol data unit including the packet is outside the range of sequence numbers allocated for initial transmissions. In some examples, the MAC layer 1135 may determine that the packet is to be transmitted in the retransmission based on the sequence number being outside the range of sequence numbers allocated for initial transmissions.

The PDCP layer 1140 may send the indication from a packet data convergence protocol layer to a radio link control layer and the medium access control layer, where the higher layer control layer is the packet data convergence protocol layer. In some examples, the RLC layer 1125 may prioritize the packet at the radio link control layer based on the indication. In some examples, the RRC layer 1130 may send one or more priorities of logical channels to the medium access control layer, where the higher layer control layer is a radio resource control layer. In some examples, the PDCP layer 1140 may select a radio link control entity at a radio link control layer to which to send the packet from a packet data convergence protocol layer based at least in part on whether the packet is to be transmitted as either an initial transmission or as a retransmission, and the PDCP layer 1140 may send the packet from the packet data convergence protocol layer to the selected radio link control entity. In some examples, the MAC layer 1135 may receive the packet in a logical channel from a radio link control layer and identify, at the medium access control layer, a priority of the logical channel based at least in part on the one or more priorities of logical channels. In some examples, the transmission process manager 1120 may determine whether the packet is to be transmitted in the initial transmission or the retransmission based on the priority of the logical channel.

In some examples, the transmission process manager 1120 may determine, at the medium access control layer and from the indication, that the packet is to be transmitted in the initial transmission. In some examples, the transmission process manager 1120 may determine, based on the packet being transmitted in the initial transmission, that the transmission process for transmission of the packet is via a broadcast channel. In some examples, the transmission process manager 1120 may determine, at the medium access control layer and from the indication, that the packet is to be transmitted in the retransmission. In some examples, the transmission process manager 1120 may determine, based on the packet being transmitted in the retransmission, that the transmission process for transmission of the packet is via either a broadcast channel or a unicast channel.

The DCI manager 1145 may transmit group-common downlink control information to schedule the initial transmission, where the packet is to be transmitted in the initial transmission. In some examples, the packet manager 1110 may transmit the packet in a shared channel to the receiving device based on transmitting the group-common downlink control information. In some examples, the DCI manager 1145 may transmit downlink control information in a UE-specific control channel to schedule the retransmission of the packet, where the packet is to be transmitted in the retransmission. In some examples, the packet manager 1110 may transmit the packet in a shared channel to the receiving device using beamforming based on transmitting the downlink control information. The encoder 1150 may encode the packet for the initial transmission or the retransmission using a rateless code.

Figure 12:
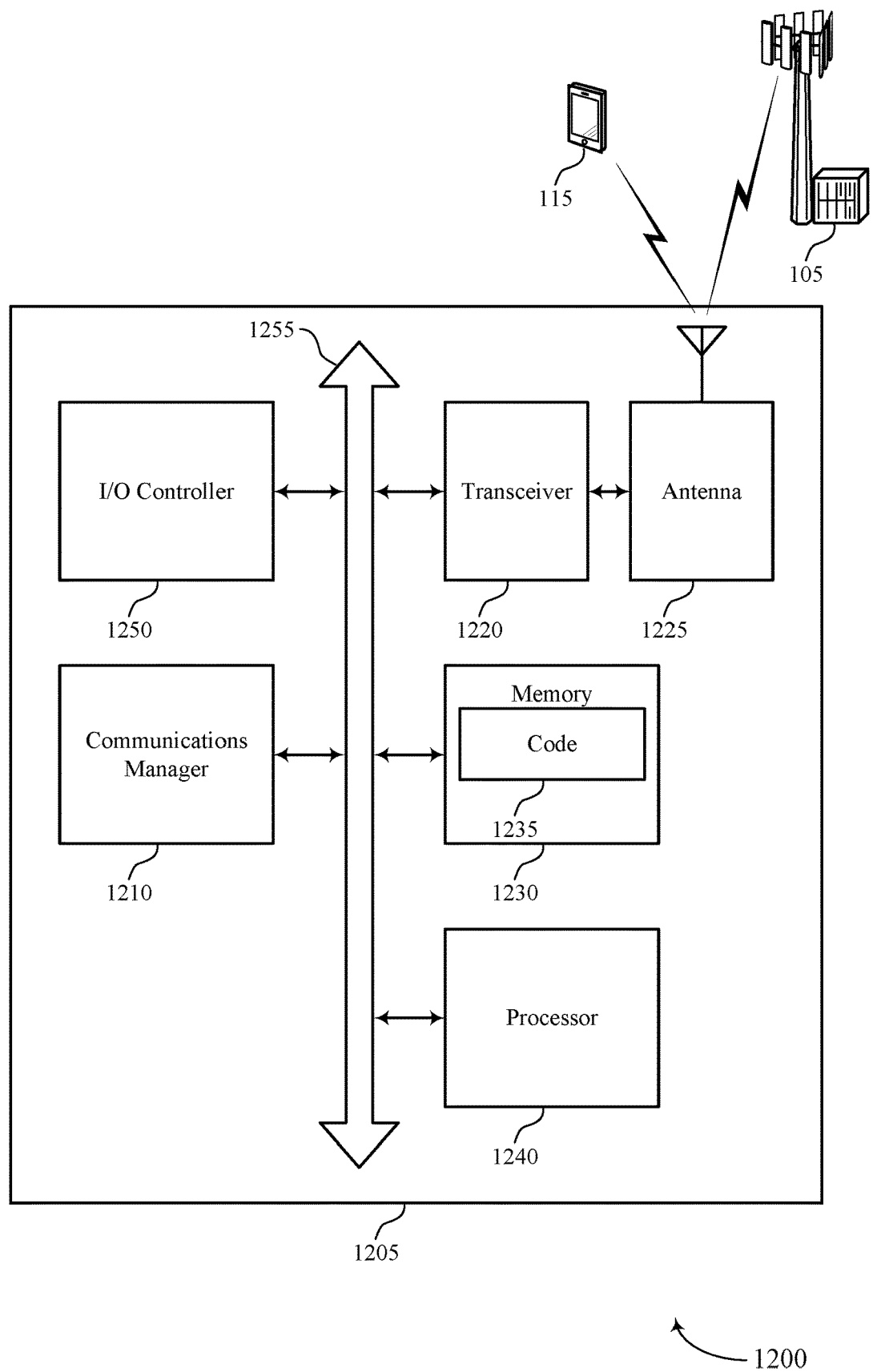
FIG. 12 shows a diagram of a system including a user equipment (UE) that supports assistance signaling for RLC retransmissions in accordance with aspects of the present disclosure.

FIG. 12 shows a diagram of a system 1200 including a device 1205 that supports assistance signaling for RLC retransmissions in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, a transceiver 1220, an antenna 1225, memory 1230, a processor 1240, and an I/O controller 1250. These components may be in electronic communication via one or more buses (e.g., bus 1255).

The communications manager 1210 may identify a packet to be transmitted to a receiving device, transmit the packet to the receiving device in accordance with the transmission process, send, to a medium access control layer of the transmitting device from a higher layer control layer that is upstream of the medium access control layer of the transmitting device, an indication by which the medium access control layer determines that the packet is to be transmitted as either an initial transmission or as a retransmission, and determine, at the medium access control layer of the transmitting device and based on the indication, a transmission process for transmission of the packet.

Transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting assistance signaling for RLC retransmissions).

The I/O controller 1250 may manage input and output signals for the device 1205. The I/O controller 1250 may also manage peripherals not integrated into the device 1205. In some cases, the I/O controller 1250 may represent a physical connection or port to an external peripheral. In some cases, the I/O controller 1250 may utilize an operating system such as iOS®, ANDROID®, MS-DOS®, MS-WINDOWS®, OS/2®, UNIX®, LINUX®, or another known operating system. In other cases, the I/O controller 1250 may represent or interact with a modem, a keyboard, a mouse, a touchscreen, or a similar device. In some cases, the I/O controller 1250 may be implemented as part of a processor. In some cases, a user may interact with the device 1205 via the I/O controller 1250 or via hardware components controlled by the I/O controller 1250.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
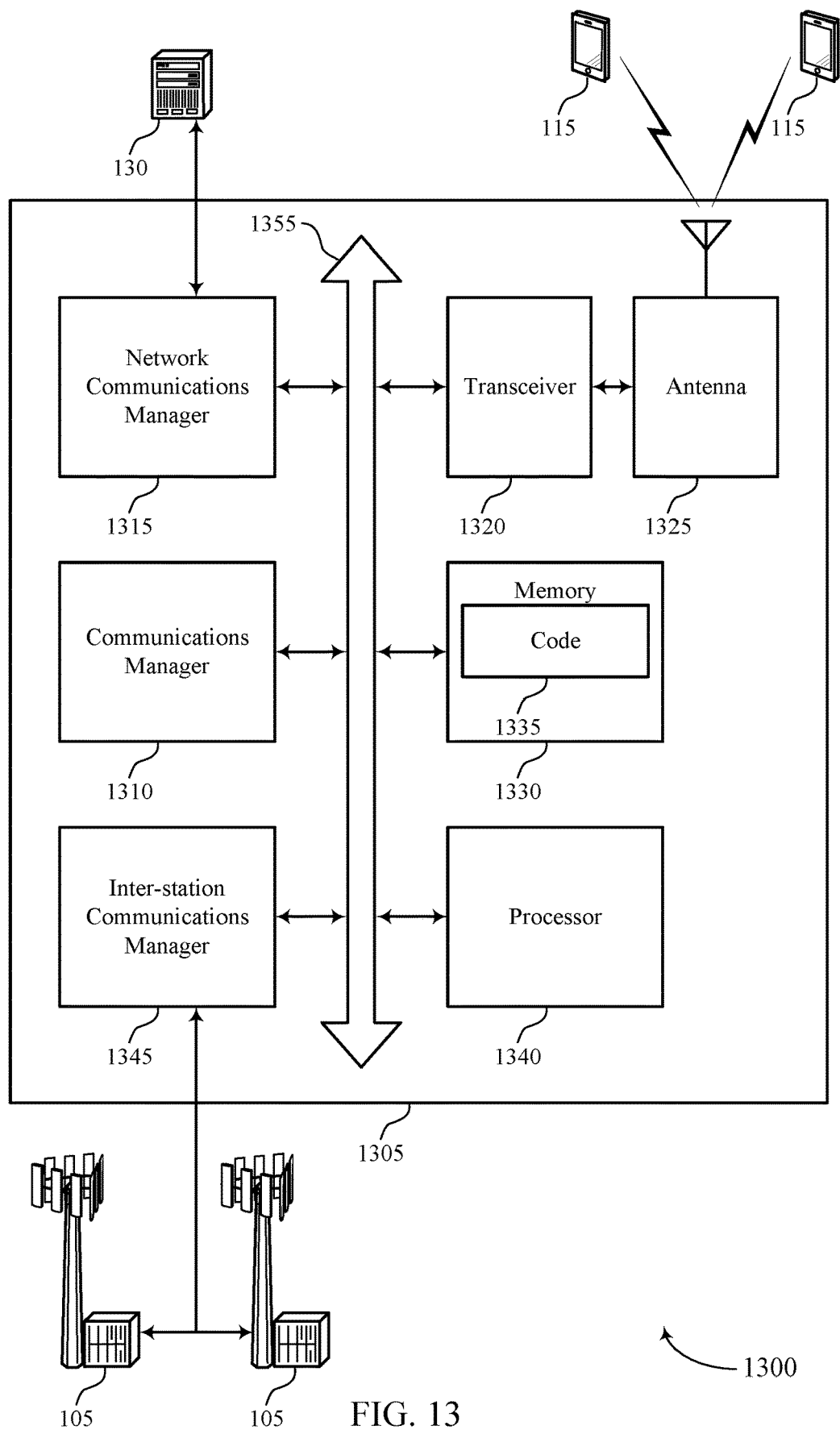
FIG. 13 shows a diagram of a system including a base station that supports assistance signaling for RLC retransmissions in accordance with aspects of the present disclosure.

FIG. 13 shows a diagram of a system 1300 including a device 1305 that supports assistance signaling for RLC retransmissions in accordance with aspects of the present disclosure. The device 1305 may be an example of or include the components of device 905, device 1005, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1355).

The communications manager 1310 may identify a packet to be transmitted to a receiving device, transmit the packet to the receiving device in accordance with the transmission process, send, to a medium access control layer of the transmitting device from a higher layer control layer that is upstream of the medium access control layer of the transmitting device, an indication by which the medium access control layer determines that the packet is to be transmitted as either an initial transmission or as a retransmission, and determine, at the medium access control layer of the transmitting device and based on the indication, a transmission process for transmission of the packet.

Network communications manager 1315 may manage communications with the core network (e.g., via one or more wired backhaul links). For example, the network communications manager 1315 may manage the transfer of data communications for client devices, such as one or more UEs 115.

Transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting assistance signaling for RLC retransmissions).

Inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
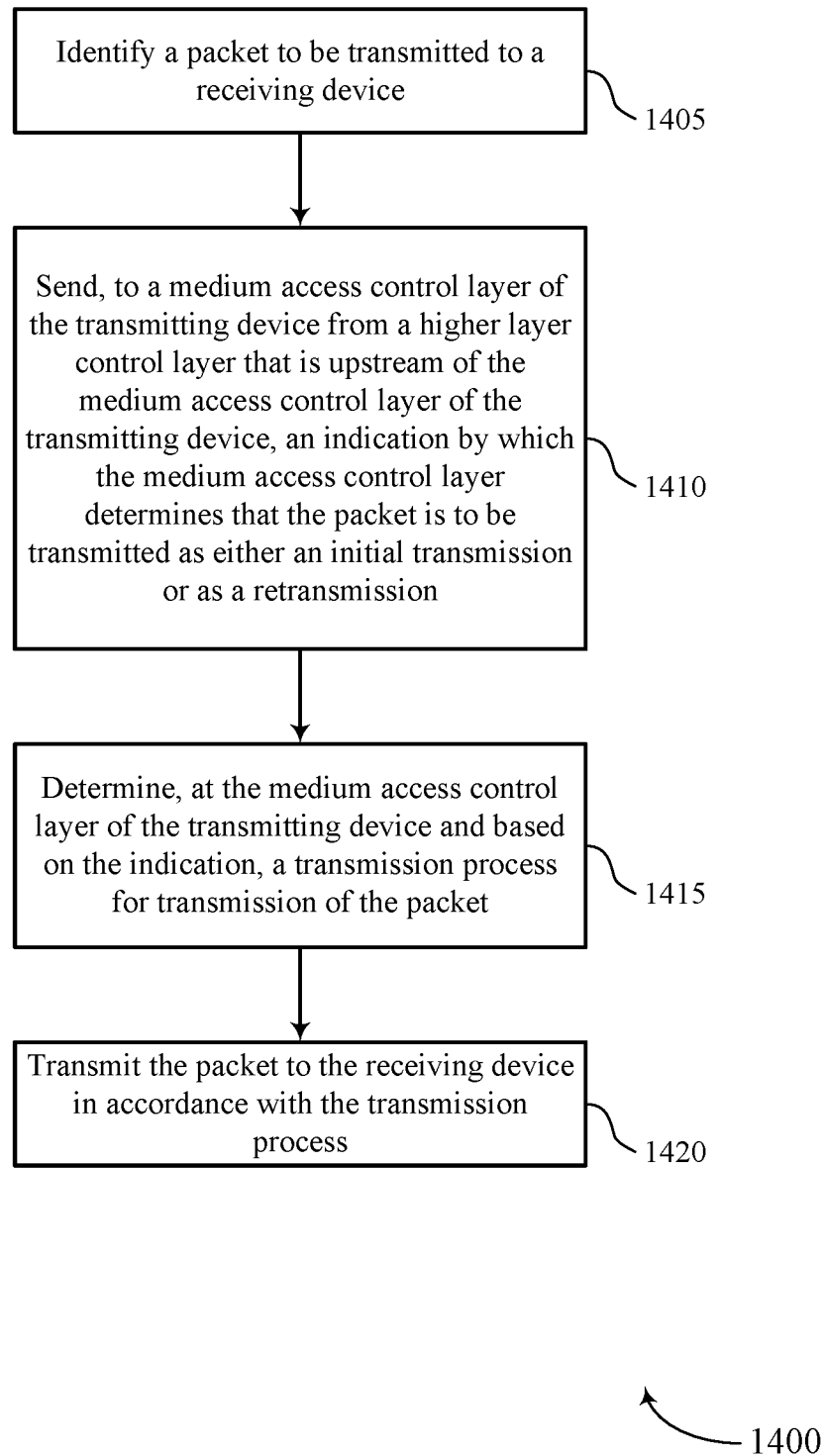
FIG. 14 shows a flowchart illustrating methods that support assistance signaling for RLC retransmissions in accordance with aspects of the present disclosure.

FIG. 14 shows a flowchart illustrating a method 1400 that supports assistance signaling for RLC retransmissions in accordance with aspects of the present disclosure. The operations of method 1400 may be implemented by a UE 115 or base station 105 or its components as described herein. For example, the operations of method 1400 may be performed by a communications manager as described with reference to FIGS. 9 through 13. In some examples, a UE or base station may execute a set of instructions to control the functional elements of the UE or base station to perform the functions described below. Additionally, or alternatively, a UE or base station may perform aspects of the functions described below using special-purpose hardware.

At 1405, the UE or base station may identify a packet to be transmitted to a receiving device. The operations of 1405 may be performed according to the methods described herein. In some examples, aspects of the operations of 1405 may be performed by a packet manager as described with reference to FIGS. 9 through 13.

At 1410, the UE or base station may send, to a medium access control layer of the transmitting device from a higher layer control layer that is upstream of the medium access control layer of the transmitting device, an indication by which the medium access control layer determines that the packet is to be transmitted as either an initial transmission or as a retransmission. The operations of 1410 may be performed according to the methods described herein. In some examples, aspects of the operations of 1410 may be performed by a layered-protocol manager as described with reference to FIGS. 9 through 13.

At 1415, the UE or base station may determine, at the medium access control layer of the transmitting device and based on the indication, a transmission process for transmission of the packet. The operations of 1415 may be performed according to the methods described herein. In some examples, aspects of the operations of 1415 may be performed by a transmission process manager as described with reference to FIGS. 9 through 13.

At 1420, the UE or base station may transmit the packet to the receiving device in accordance with the transmission process. The operations of 1420 may be performed according to the methods described herein. In some examples, aspects of the operations of 1420 may be performed by a packet manager as described with reference to FIGS. 9 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a transmitting device, comprising:
   identifying a packet to be transmitted to a receiving device;
   sending, to a medium access control layer of the transmitting device from a higher layer control layer that is upstream of the medium access control layer of the transmitting device, an indication as a range of sequence numbers allocated for initial transmissions by which the medium access control layer determines that the packet is to be transmitted as either an initial transmission or as a retransmission;
   determining, at the medium access control layer, that a sequence number of a radio link control protocol data unit comprising the packet is within the range of sequence numbers allocated for initial transmissions;
   determining that the packet is to be transmitted in the initial transmission based at least in part on the sequence number being within the range of sequence numbers allocated for the initial transmissions;
   determining, at the medium access control layer of the transmitting device and based at least in part on the indication, a transmission process for transmission of the packet, wherein the transmission process for transmission of the packet is via either a broadcast channel or a unicast channel; and
   transmitting the packet to the receiving device in accordance with the transmission process.

2. The method of claim 1, wherein sending the indication to the medium access control layer comprises:
   sending the indication in a radio link control protocol data unit header, wherein the higher layer control layer is a radio link control layer.

3. The method of claim 1, wherein the higher layer control layer is a radio resource control layer.

4. The method of claim 3, further comprising:
   determining, at the medium access control layer, that a second sequence number of a second radio link control protocol data unit comprising a second packet is outside the range of sequence numbers allocated for the initial transmissions; and
   determining that the second packet is to be transmitted in the retransmission based at least in part on the second sequence number being outside the range of sequence numbers allocated for the initial transmissions.

5. The method of claim 1, wherein sending the indication to the medium access control layer comprises:
   sending the indication from a packet data convergence protocol layer to a radio link control layer and the medium access control layer, wherein the higher layer control layer is the packet data convergence protocol layer.

6. The method of claim 5, further comprising:
   prioritizing the packet at the radio link control layer based at least in part on the indication.

7. The method of claim 1, wherein determining the transmission process for transmission of the packet comprises:
   determining, based at least in part on the packet being transmitted in the initial transmission, that the transmission process for transmission of the packet is via the broadcast channel.

8. The method of claim 1, further comprising:
   determining, at the medium access control layer and from a second indication, that a second packet is to be transmitted in the retransmission; and
   determining, based at least in part on the second packet being transmitted in the retransmission, that a second transmission process for transmission of the second packet is via the unicast channel.

9. An apparatus for wireless communication at a transmitting device, comprising:
   at least one processor; and
   at least one memory coupled with the at least one processor, with instructions stored in the at least one memory, the instructions being executable by the at least one processor, individually or in any combination to cause the apparatus to:
   identify a packet to be transmitted to a receiving device;
   send, to a medium access control layer of the transmitting device from a higher layer control layer that is upstream of the medium access control layer of the transmitting device, an indication as a range of sequence numbers allocated for initial transmissions by which the medium access control layer determines that the packet is to be transmitted as either an initial transmission or as a retransmission;
   determine, at the medium access control layer, that a sequence number of a radio link control protocol data unit comprising the packet is within the range of sequence numbers allocated for initial transmissions;
   determine that the packet is to be transmitted in the initial transmission based at least in part on the sequence number being within the range of sequence numbers allocated for the initial transmissions;
   determine, at the medium access control layer of the transmitting device and based at least in part on the indication, a transmission process for transmission of the packet, wherein the transmission process for transmission of the packet is via either a broadcast channel or a unicast channel; and
   transmit the packet to the receiving device in accordance with the transmission process.

10. The apparatus of claim 9, wherein the instructions to send the indication to the medium access control layer are executable by the at least one processor to cause the apparatus to:

send the indication in a radio link control protocol data unit header, wherein the higher layer control layer is a radio link control layer.

11. The apparatus of claim 9, wherein the higher layer control layer is a radio resource control layer.

12. The apparatus of claim 11, wherein the instructions are further executable by the at least one processor to cause the apparatus to:
  determine, at the medium access control layer, that a second sequence number of a second radio link control protocol data unit comprising a second packet is outside the range of sequence numbers allocated for the initial transmissions; and
  determine that the second packet is to be transmitted in the retransmission based at least in part on the second sequence number being outside the range of sequence numbers allocated for the initial transmissions.

13. The apparatus of claim 9, wherein the instructions to send the indication to the medium access control layer are executable by the at least one processor to cause the apparatus to:
  send the indication from a packet data convergence protocol layer to a radio link control layer and the medium access control layer, wherein the higher layer control layer is the packet data convergence protocol layer.

14. The apparatus of claim 13, wherein the instructions are further executable by the at least one processor to cause the apparatus to:
  prioritize the packet at the radio link control layer based at least in part on the indication.

15. The apparatus of claim 9, wherein the instructions to determine the transmission process for transmission of the packet are executable by the at least one processor to cause the apparatus to:
  determine, based at least in part on the packet being transmitted in the initial transmission, that the transmission process for transmission of the packet is via the broadcast channel.

16. The apparatus of claim 9, wherein the instructions are further executable by the at least one processor to cause the apparatus to:
  determine, at the medium access control layer and from a second indication, that a second packet is to be transmitted in the retransmission; and
  determine, based at least in part on the second packet being transmitted in the retransmission, that a second transmission process for transmission of the packet is via the unicast channel.

17. An apparatus for wireless communication at a transmitting device, comprising:
  means for identifying a packet to be transmitted to a receiving device;
  means for sending, to a medium access control layer of the transmitting device from a higher layer control layer that is upstream of the medium access control layer of the transmitting device, an indication as a range of sequence numbers allocated for initial transmissions by which the medium access control layer determines that the packet is to be transmitted as either an initial transmission or as a retransmission;
  means for determining, at the medium access control layer, that a sequence number of a radio link control protocol data unit comprising the packet is within the range of sequence numbers allocated for initial transmissions;
  means for determining that the packet is to be transmitted in the initial transmission based at least in part on the sequence number being within the range of sequence numbers allocated for the initial transmissions;
  means for determining, at the medium access control layer of the transmitting device and based at least in part on the indication, a transmission process for transmission of the packet; and
  means for transmitting the packet to the receiving device in accordance with the transmission process.

18. A non-transitory computer-readable medium storing code for wireless communication at a transmitting device, the code comprising instructions executable by a processor to:
  identify a packet to be transmitted to a receiving device;
  send, to a medium access control layer of the transmitting device from a higher layer control layer that is upstream of the medium access control layer of the transmitting device, an indication as a range of sequence numbers allocated for initial transmissions by which the medium access control layer determines that the packet is to be transmitted as either an initial transmission or as a retransmission;
  determine, at the medium access control layer, that a sequence number of a radio link control protocol data unit comprising the packet is within the range of sequence numbers allocated for initial transmissions;
  determine that the packet is to be transmitted in the initial transmission based at least in part on the sequence number being within the range of sequence numbers allocated for the initial transmissions;
  determine, at the medium access control layer of the transmitting device and based at least in part on the indication, a transmission process for transmission of the packet; and
  transmit the packet to the receiving device in accordance with the transmission process.

* * * * *